ALFRED MARZOCCHI &
JAMES M. O'FLAHAVAN (DECEASED)
BY LORRAINE C. O'FLAHAVAN,
ADMINISTRATRIX
INVENTORS

BY
ATTORNEYS

United States Patent Office

3,462,523
Patented Aug. 19, 1969

3,462,523
CELLULAR COMPOSITIONS AND FIBROUS GLASS COATED THEREWITH
Alfred Marzocchi, Cumberland, R.I., and James M. O'Flahavan, deceased, late of Manville, R.I., by Lorraine C. O'Flahavan, administratrix, Cumberland, R.I., assignors to Owens-Corning Fiberglas Corporation, Toledo, Ohio, a corporation of Delaware
Continuation of application Ser. No. 410,808, Nov. 12, 1964, which is a continuation-in-part of application Ser. No. 109,106, May 10, 1961. This application Dec. 10, 1965, Ser. No. 513,034
Int. Cl. C08f 47/08; C08g 22/44; C08b 29/10
U.S. Cl. 264—45        14 Claims

ABSTRACT OF THE DISCLOSURE

A method of forming a plastic material into a fibrous cellular structure which has good hand and which is warm to the touch. The process is carried out by forming a dilute solution of a plastic material in a primary solvent which has a boiling point above the softening point of the plastic, followed by immersion of this material, at a temperature above its softening point, into a second solvent bath in which the primary solvent is miscible, and in which the plastic material is immiscible.

---

The present invention relates to cellular compositions, methods for their preparation, and particularly to fibrous glass elements coated therewith, and is a continuation of our co-pending application Ser. No. 410,808 filed Nov. 12, 1964, which in turn is a continuation-in-part of our then co-pending application Ser. No. 109,106 filed May 10, 1961, now abandoned.

Previous efforts have been directed at the attainment of foam coated yarn structures and in some instances a limited success has been achieved. The desirability of such structures is apparent in that a low density bulk is imparted to the yarns, tensile strengths are increased, and most important in the case of fibrous glass strands, the resiliency and elongation characteristics of the structure are greatly enhanced.

In order to achieve the desirable attributes of such yarn-foam composites, two major requirements are presented. In the first instance, penetration of the fibrous strand by the cellular compositions must be accomplished in order to attain bulking, inter-fiber cushioning, susceptibility to elongation, and a resiliency conducive arrangement of the high and low modulus materials. Secondly, the cellular material utilized must possess the requisite qualities of density, modulus, adherency and the ability to enter into a state of mutual support or reinforecement with the fibrous structure.

Previous attempts in this direction have been met by failure stemming from both the lack of penetration of the coating material, which results in inadequate bulking and inter-fiber cushioning with correspondingly unsuitable tensile strengths and resiliency, and from the failure of conventional cellular materials to provide adequate properties even if penetration is achieved.

It is an object of this invention to provide a novel, cellular composition.

Another object is the provision of fibrilocellular-fiber composites which exhibit unusual properties.

An additional object is the provision of methods for the preparation of foam impregnated fibrous elements.

Figure 1:
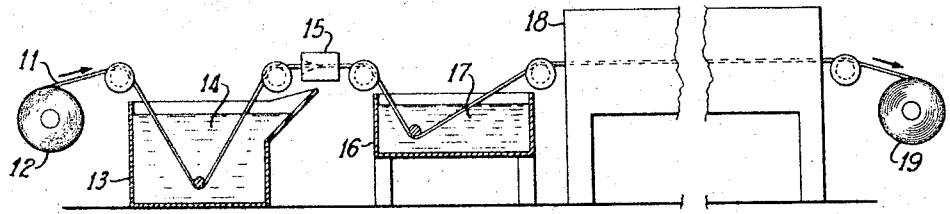
Figure 2:
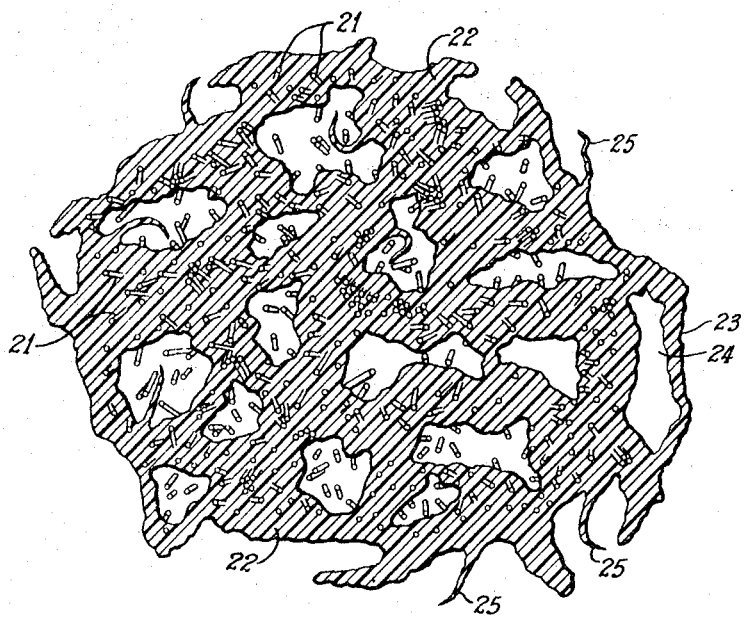

These and other objects and advantages of this invention will hereinafter appear, and for purposes of illustration, but not of limitation, an embodiment of the invention is shown in the accompanying drawing in which FIGURE 1 depicts a schematic view of a coating method and apparatus employed in accordance with the practice of this invention; and FIGURE 2 is an enlarged sectional view of a fibrous glass strand treated in accordance with the invention.

The aforegoing objects are achieved through a novel foam composition prepared by introducing a solution comprising a film-forming material and a primary solvent for the film former, into a secondary solvent having a vapor pressure lower than that of the primary solvent and in which the primary solvent is soluble but the film-forming material is insoluble, and maintaining the mixture at a temperature above the vapor point of the primary solvent.

As a result of the solubility of the primary solvent in the second solvent, increments of the film-forming material are precipitated and coagulated to encapsulate the remainder of the primary solvent-film former system and the capsules or cells thus formed are progressively and successively burst, due to the explosive vaporization of the primary solvent, with each successive bursting attended by a re-encapsulation.

By means of this method, a foam comprising an interconnected arrangement of cells, fibrils and fragments of exploded cell walls or film, is obtained. Unlike conventional foams which constitute massed open or closed cells, the foams of the present invention exhibit inherent qualities of reinforcement, mutual support, elasticity, resiliency and the freedom of movement of entrained, alien, fibrous reinforcements, as a product of the method of foaming utilized. The fibrilo-cellular structure of these foams is unique in their highly desirable structural heterogeneity as demonstrated by photomicrographs in which a series of cells interconnected by fibrils and fragmentary cell walls resulting from the explosive foaming action, are apparent. It further appears that the fibrils contain smaller, entrained cells or voids which serve to reduce their density while providing further bulk and reinforcement.

An additional desirable quality which is yielded when the foams or cellular compositions are combined with fibrous strands is the displacement of the bunched or grouped fibers and the penetration of the strand structure by the cellular coating material as a result of the repeated disruptions or explosions which are inherent in the method of foam formation.

The prescribed method of foam formation should not be confused with superficially similar techniques. For example, in the production of cellular cellulose acetate materials an extrusion technique relying upon the mechanical entrapment of a solvent with a relatively high vapor pressure, within the cellulose acetate, and a temperature-pressure relationship sufficient to cause the resin-solvent mixture to flow is utilized. However, in this method the mixture is maintained at a high pressure within the extruder and subjected to atmospheric pressure upon emergence from the extruder head, whereby the solvent vaporizes to produce cellular voids.

Also, in the case of urethane foams, the foaming may be achieved by carbon dioxide generated by the reaction of water and the isocyanate employed. In addition, since the reaction is exothermic, advantage may be taken of the heat generated in order to evaporate a low boiling solvent which may or may not be miscible with the reactants.

It is apparent that the aforementioned methods differ from those of the invention, wherein the miscibility of the secondary solvent with the primary solvent and the lack of solubility of the film-forming material in the secondary solvent, results in the reduction of the solubility of the film-former in the primary-secondary solvent mixture, to the extent that coagulation or insolubility is achieved and a film which serves to encapsulate a portion of the resin dissolved in the primary solvent results. The temperature of the secondary solvent then serves to vaporize the entrapped solvent and thereby rupture the capsule to allow the penetration of the secondary solvent and the occurrence of another cycle of encapsulation, rupture and penetration.

FOAMING METHOD

The conduct of the foam forming method of the invention is aptly demonstrated by the following example:

Example I

A solution prepared from cellulose acetate tow and acetone was poured into a beaker of boiling water. A fibrillated, foamed structure began immediately to form and precipitate. The water was poured off to leave an integral mass which upon close examination exhibited the presence of cellular, fibrous and fragmentary film-portions.

The above example is merely utilized to demonstrate a simple and unsophisticated embodiment of the methods and products of the invention. Other methods involving closer control of the technique are apparent both from the disclosure and from related extant art. In addition, a variety of film-forming materials other than cellulose acetate may be employed both in the fabrication of the fibrillo-cellular structures per se and as yarn coatings which are discussed in a subsequent section of the present specification. Representative but non-limitative examples of suitable film-formers, include cellulose acetate, triacetate, acetate butyrate and nitrate, alkyl celluloses, polyurethanes, polyolefins, halogenated polyolefins, polyamides, polymers and copolymers of acrylic and methacrylic acids and their esters, styrene polymers and copolymers, polyesters, polyvinyl alcohols and esters, vinyl polymers and copolymers, epoxy resins, elastomers, and proteinaceous and amylaceous compositions.

The selection of the film-forming material is substantially unlimited but must be amenable to a two solvent system in which:

(a) the primary solvent for the film-forming material possesses a vapor pressure higher than that of the secondary solvent,
(b) the primary solvent is soluble in the secondary solvent,
(c) the film-forming material is insoluble in the secondary solvent.

Obviously, the selection of the two solvents must also take into consideration the melting point of the film-forming material. For example, the boiling point of the primary solvent should not be so high as to necessitate maintaining the secondary solvent at a temperature which is drastically above the softening or melting point of the film-forming material and which impairs the film or cell forming power of the film-forming material. Specifically, extremely high temperatures may weaken the films or cells which are formed and cause their collapse. Naturally, this condition is dependent upon the individual characteristics of the film-forming material, e.g. melting point, cell forming properties or film strength at various temperatures, etc. In addition, it must be realized the temperature of the secondary solvent and the thermally induced weakening of the film are not absolute limitations. In the first instance, the film-forming material is actually not subjected to the temperature at which the secondary solvent is maintained in that the volatilization of the primary solvent yields a cooling effect in the immediate area of the film-forming material. Secondly, an immersion of the film-forming material in the secondary solvent which is of short duration serves to counteract any thermal weakening of the cells or films. For example, the rapid cooling experienced upon the withdrawal of the film-forming material from the secondary solvent acts to strengthen the weakened film. As subsequently described, a short exposure to the secondary solvent, is adequate to achieve the desired result with certain systems. However, at higher temperatures the foam or cell forming effect of the present invention is accelerated and the exposure to the secondary solvent is correspondingly reduced. In addition, any thermal weakening is simultaneously attended by increased foaming due to the thermal activation, i.e. vaporization, which tends to counteract the collapse of the film or cells. As demonstrated by the examples, satisfactory structures are obtained when the temperature of the secondary solvent exceeds the melting or softening point of the film-forming material.

In this regard, the immersion or exposure of the film-former-primary solvent system to the secondary solvent is ideally maintained until vaporization is complete and the primary solvent is substantially dispelled in order to avoid excessive solvent attack upon the resulting cellular structure. However, if the primary sovent is predominantly vaporized or if immediate drying or curing completes its removal, this consideration is of negligible significance. It should also be noted that in the case of the utilization of secondary solvents which are employed at their vapor point, e.g. boiling water, the foaming action may be continued by the secondary solvent after the removal of the primary solvent. Specifically, portions of the secondary solvent which become entrapped within the film-forming material as a result of the disruptive action of the vaporization of the primary solvent may also be vaporized. In this sense the invention may be viewed as a method of introducing a noncompatible "blowing agent" within a continuous foamable matrix.

Preferably, the cellular materials are subjected to a drying and/or curing treatment as set forth in the succeeding examples. However, prior to or instead of such treatment, the cellular structures may be subjected to washing, pigmentation, the application of particulate materials such as colloidal silica, cotton linters, or the like, etc. In the case of particulate pigments, linters, and the like, it must be realized that the tacky surface of the cellular material as it emerges from the secondary solvent, is an ideal adhesive environment for such particulate material. In addition, when a more porous or absorbent cellular structure is desired the cellular composition may be subjected to a leaching treatment such as described by U.S. 3,125,541 and 3,125,542.

Naturally, the selection of the primary and secondary solvents is further dependent upon the material which is selected as the film-forming material. Specifically, once the film-forming material is determined one may readily select operable solvents from standard handbooks, references and publications which provide the solubility characteristics, boiling points, etc., of the film-forming material and solvents. Again, such a determination may be simply made on the basis of the following criteria:

The film-forming material must be:

(a) capable of yielding a foamed or cellular structure,
(b) soluble in the primary solvent,
(c) substantially insoluble in the secondary solvent, and
(d) capable of yielding a foamed or cellular structure at the temperature at which the secondary solvent is maintained.

The primary solvent must be:

(a) a solvent for the film-forming material,
(b) soluble in the secondary solvent, and (c) capable of vaporization at the temperature at which the secondary solvent is maintained.

The secondary solvent must be:

(a) a solvent for the primary solvent,
(b) capable of being maintained at a temperature above the boiling point of the primary solvent, and
(c) relatively inert in respect to the film-forming material.

On the basis of the foregoing it is apparent that one may readily select a suitable system by mere referene to known or published facts concerning the potential ingredients. For example, one may select a desired film-forming material which is capable of yielding a cellular material with conventional foaming techniques, e.g. mechanical or chemical foaming. The materials in which the selected foamable, film-forming material is soluble may then be segregated as potential candidates for the primary solvent and materials in which the latter compositions are soluble provide potential candidates for the secondary solvent. The segregation of operable systems may then be achieved by selecting combinations of primary and secondary solvents in which the latter is capable of being maintained at a temperature above the boiling or vapor point of the primary solvent. It must be noted that the consideration of the vapor point may be dependent upon the pressure under which the invention is to be practiced at any given temperature.

It should also be realized that the terms "vapor point" and "boiling point" have been employed synonymously throughout the present description. Obviously, since the foaming action of the present invention is dependent upon the vaporization of the primary solvent, the point referred to regardless of whether it is termed a boiling or vapor point, is that temperature at which the vapor pressure of the primary solvent exceeds the pressure of the confining atmosphere. A more precise definition might comprise the actual boiling point of the primary solvent. For example, if water was employed as the primary solvent, its "boiling point" or "vapor point" in terms of the invention would be 81° C. at a pressure of one-half atmosphere, 100° C. at 1 atmosphere and 200° C. at 16 atmospheres.

Further factors which may influence, but not restrict, the selection of operable systems are the viscosity-temperature characteristics of the film-forming material and the inertness of the latter in respect to the secondary solvent. For example, the vapor point of the primary solvent should obviously not involve temperatures at which the film-forming material is decomposed, degraded or reduced in viscosity to the point that a weak or unsatisfactory film is experienced during the period in which foaming is experienced as the result of the volatilization of the primary solvent. However, even the effects of such considerations may be counteracted by means of the cooling effect which is realized as the result of the vaporization of the primary solvent, e.g. through increasing the ratio of primary solvent to film-forming material, or by reducing the pressure applied to the system to achieve a corresponding reduction in the vapor point of the primary solvent.

In addition, it is preferable to employ a secondary solvent in which the film-forming material is insoluble. However, some solubility is tolerable provided that it is less than the solubility of the film-forming material in the primary solvent, and of the primary solvent in the secondary solvent under the prevalent conditions. For example, it is immaterial that the secondary solvent is capable of dissolving the film-forming material under conditions of time, temperature, concentration, etc., which are not experienced in the system employed. Specifically, the practice of the invention would not be influenced by the fact that the film-forming material is soluble in the secondary solvent at a temperature of 250° F. when the primary solvent has a boiling point of 160° F. and the secondary solvent may accordingly be maintained at a temperature below 250° F. In addition, a secondary solvent which does not appreciably dissolve the film-forming material in the exposure time necessitated for the practice of the invention may be employed.

It is also preferable to employ primary and secondary solvents in which the difference between the boiling point of the primary solvent and the temperature at which the secondary solvent may be maintained is appreciable. For example, a solution of a film-forming material in secondary butyl alcohol (B.P. 210° F.) may be foamed in a bath of boiling water in that the vaporization of the primary solvent may be achieved at a temperature only slightly in excess of its vapor point. However, at such slight differences in temperature, close control of the temperature of the secondary solvent must be maintained, longer exposures may be required in order to bring the mass of the film-former-primary solvent system to the vapor point of the primary solvent, the cooling effect of the vaporization of the primary solvent upon the temperature of the secondary solvent must be compensated for, etc.

Conversely, the nature of the cellular structure desired may dictate the utilization of a lesser temperature differential. For example, if a closed cell foam is desired it is preferable to employ the secondary solvent at a temperature which is only slightly above the vapor point of the primary solvent. By means of such an approach a less explosive vaporization of the primary solvent and subsequent expansion of the vapors is realized. Alternatively, the introduction of the primary solvent-film-forming material system into a secondary solvent which is maintained at a temperature substantially above the vapor point of the primary solvent yields an explosive situation in which the cells are open or fragmented to comprise a fibrillated residue or fragments of the cell walls of the exploded cells.

It must also be realized that the temperature at which the secondary solvent is maintained may actually be its own vapor point, e.g. boiling water. While such practices are feasible in the case of economical solvents such as water, it is apparent that the vaporization of other materials employed as the secondary solvent may necessitate solvent recovery. In this regard, it should be noted that the secondary solvent may yield the desired result while in a non-liquid form. For example, if boiling water is employed as the secondary solvent in a closed treating system, the resultant steam also functions as the secondary solvent in dissolving, segregating and vaporizing the primary solvent.

While tetrahydrofuran and water are preferred as the primary and secondary solvents in the preparation of a polyurethane foam, it is obvious that suitable systems may be selected by mere reference to the solubility, film-forming and vaporization characteristics of existing film-formers and solvents.

For example, a polystyrene film-former is soluble in methyl ethyl ketone which is in turn soluble in either normal propanol or isopropanol. In addition, the latter possess boiling points of 207° and 180° F. respectively while methyl ethyl ketone boils at 176° F., and polystyrene is insoluble in both of the alcohols. Consequently, a solution of polystyrene in methyl ethyl ketone may be introduced into boiling propanol or isopropanol to yield the inventive results. Additional film-former and solvent systems are supplied by the following table:

| Film-forming material | Primary solvent | Secondary solvent | Temperature at which secondary solvent is maintained (Fahrenheit) |
|---|---|---|---|
| Polystyrene | Benzene | Butanol | 210–240 |
| Cellulose acetate butyrate. | Ethyl acetate | Isopropanol | 172–176 |
| Methyl methacrylate. | Toluene | Methyl isobutyl carbinol. | 235–260 |
| Polyvinyl chloride | Methyl ethyl ketone. | Water | 180–210 |
| Epoxy resin | do | do | 180–210 |

FOAM COATING OF FIBROUS STRANDS

The application of fibrilo-cellular coatings to fibrous glass structures such as strands or yarns is achieved by employing the methods and materials of the previous section in a coating technique. Broadly, the primary solvent-film-former system is applied to the fibrous glass structure and the thus coated or impregnated structure is then exposed to the secondary solvent which is maintained at a temperature above the vapor point of the primary solvent. Consequently, the cyclic phases of coagulation, encapsulation, vaporization, and rupturing are repetitively achieved in situ or upon the fibrous glass structure. Obviously, this coating or impregnation technique is generally applicable to both fibrous and non-fibrous structures as well as to non-siliceous structures and fibrous glass forms other than strands or yarns, as for example, fibrous glass single filaments, rovings, fabrics, chopped strand and mats or wool.

An effective method for achieving the desired coating is illustrated by the drawing wherein a fibrous glass yarn 11 is withdrawn from a supply package 12, passed through a bath 13 containing a solution 14 of the film-forming material in the primary solvent, passed through a die 15 which serves to remove excessive coating material, immersed in a second bath 16 which contains the secondary solvent 17 which is maintained at a temperature above the vapor point of the primary solvent, passed through an oven 18 maintained at a temperature adequate to cure the coating and finally wound into a cylindrical package 19. It is advisable to avoid undue tension upon the yarn 11 after its introduction to the second bath 16 in order to prevent the crushing or compression of the foamed matrix prior to curing.

The type of product yielded is depicted by FIGURE 2 which comprises an enlarged sectional view of a fibrous glass yarn which has been coated in accordance with the invention. It may be noted that the glass fibers 21 of the yarn are widely dispersed throughout a resinous matrix 22 which comprises a cellular mass made up of cell walls 23, cellular voids 24 and fibrils 25, which are reinforced by the glass fibers 21.

When the apparatus and method of the drawing are employed with a coating system employing a polyurethane film-former, tetrahydrofuran as the primary solvent and water as the secondary solvent, the water in bath 7 is constantly maintained at its boiling point and satisfactory curing may be attained by maintaining the oven at a temperature of 480° F. and exposing the coated yarn to that temperature for a period of 15 seconds.

Employing the materials and methods of the invention in conjunction with fibrous glass strands or yarns has resulted in the attainment of fibrous glass products demonstrating highly unusual characteristics and the opening of entirely new areas of application to fibrous glass.

To date, the utilization of fibrous glass fabrics has been restricted to decorative fenestration fabrics and crude fabrics employed in the reinforcement of synthetic resins. The interjection of fibrous glass fabrics into the broader realm of fabrics such as upholstery fabrics, wearing apparel, carpeting and industrial fabrics has been stymied both by certain defects inherent in fibrous glass in its previously known forms, and by a consumer antipathy toward the use of fibrous glass in applications involving bodily contact or tactile response.

Despite the resiliency of glass fibers, the filaments are plagued by limited flexibility and the tendency to break once a critical angle of flex or bending is surpassed. In addition, the fibers are easily broken if a longitudinal force is suddenly applied or if the plurality of fibers embodied in a strand are not permitted to align before jointly assuming the longitudinal force.

Accordingly, the utilization of fibrous glass fabrics has been primarily restricted to static or non-dynamic applications which are free of repetitive or frequent flexing or subjection to tensile shock.

In regard to consumer reaction, the public is reluctant to adopt fabrics having a hard or cold feel for applications such as wearing apparel or upholstery fabrics. The contrast with the warmth and dryness of materials such as cotton or wool is quite pronounced and comprises a significant factor since one of the primary impediments to the utilization of synthetic fabrics generally, and fibrous glass fabrics particularly, has been the consumers reaction to the feel or handle of such fabrics as contrasted with conventional materials to which the public has become accustomed.

These two major impediments to the expansion of fibrous glass fabrics into the mentioned areas of application, are overcome by the products of the present invention.

In the first instance, fibrous glass strands coated and impregnated with the cellular compositions of the invention are endowed with unusual properties of resiliency, elasticity, compressibility, flexibility, elongation and resistance to tensile stress. Such improvements are the product of the fibrilo-cellular-fibrous composite which is achieved, wherein the high modulus glass, low modulus resin combination provides a substantially permanent spring in which the elasticity of the resin prevents the sudden application of longitudinal forces to the glass fibers before the fibers are enabled to align for simultaneous or united assumption of the force, and the glass fibers take up the stress before the breaking point of the resin is reached. In addition, the foam serves to protect the fibers from abrasion and to provide a cushioning material between the fibers during the crucial period of fiber adjustment which succeeds the initial application of longitudinal force and precedes the assumption of such force by the fibers. In the absence of such alignment, individual fibers are subjected to the total force and the true tensile strength of the combined plurality of fibers is never realized. Such cushioning is also highly beneficial in respect to imparting extensibility or stretchiness to the yarns and in protecting them against harmful flexing. Although individual glass filaments can endure extensive flexing, plural filament structures such as yarns degrade rapidly when flexed. In addition, it serves to curtail the deleterious effect of radial forces applied to the yarns while they are in either a stressed or relaxed position by cushioning such forces. Still further, the explosive nature of the foam formation serves to bulk the fibrous strand, insure the thorough penetration of impregnant, and to disperse the fibrous reinforcement throughout the resinous matrix.

In respect to the problem of consumer acceptance, the fibrilo-cellular-fibrous composite yields unusual and highly satisfactory tactile qualities or hand. The dry, absorbent nature of the discontinuous, resinous impregnant creates a warm feel and this effect may be even further enhanced by admixing milled or short fibers such as cellulosic fibers generally and milled cotton fibers, organic fibers or paper, with the impregnant or by applying them to the freshly coated, but uncured strand. The improved hand of these yarns and of fabrics woven therefrom is apparently the result of the fact that the surface of the strands comprises a fibrous, discontinuous web in which the fibrous constituents are primarily resinous rather than siliceous. This phenomenon is apparent under close scrutiny and particularly under microscopic observation, whereby it may be seen that the resinous impregnant is primarily of a fibrous rather than a cellular nature.

Examples of techniques and materials for the coating of fibrous yarns in accordance with the invention are provided by the following examples:

Example 2

A ⅛ yarn comprising 8 plied and twisted fibrous glass strands was impregnated with a solution comprising 1 part of polyurethane resin in 10 parts of tetrahydrofuran by immersing the yarn in the resin solution, as illustrated by the drawing, and subsequently passing the impregnated yarn through a body of boiling water. The resinous coating of the yarn was then cured by subjection to a temperature of 480° F. for a period of 15 seconds.

Example 3

A 1/8 yarn was coated with a mixture of the following materials:

| | Percent |
|---|---|
| Ethyl acrylate-acrylic acid copolymer (aqueous emulsion, 46% solids) | 5.92 |
| Cellulose acetate | 1.97 |
| Acetone | 85.45 |
| Water | 5.92 |
| Isooctyl phenyl polyethoxy ethanol | .74 |

The yarn was prepared as in Example 2 and cured for 2 minutes at 320° F.

Example 4

A 1/8 yarn was coated with a mixture of the following materials:

| | Percent |
|---|---|
| Ethyl acrylate-acrylic acid copolymer (aqueous emulsion, 46% solids) | 8.8 |
| Milled cotton fibers | 2.2 |
| Acetone | 89.0 |

The yarn was coated and subsequently treated as in Example 2.

The yarns of Examples 2–4 and fabrics woven therefrom, all exhibited an unusually dry, warm and absorbent feel. Microscopic examination revealed that the yarns were covered with a fibrilocellular web which was characterized by the previously discussed resinous fibers, cells and fragmentary cell walls. In the case of Example 4, the resinous web was further reinforced by the milled cotton fibers. All of the yarns were characterized by unusual qualities of extensibility, tensile strength and compressibility. In addition, microscopic examination of yarn cross-sections revealed that the fibers contained in the strands making up the original yarn, had been displaced by the foaming action and dispersed or distributed throughout the resinous matrix to provide an excellent reinforcing condition and simultaneously to derive the protective and cushioning properties stemming from the presence of the resin between the fibers.

The decorative value of the yarns may also be enhanced through the addition of dyes or pigments to the resinous coating material. Color values may also be achieved through the use of blended yarns comprising both fibrous glass and resinous fibers. This approach has further value in that the organic fibers may be employed to further interbond the glass fibers and the resinous coating by means of the fusion of the resinous fibers.

While fibrous glass yarns have been employed throughout the specification to demonstrate the efficacy and improvements provided by the invention, it should be understood that such illustrations are merely representative and non-limitative. For example, non-fibrous materials as well as resinous yarns, vegetable or cellulosic yarns and cords such as those formed from paper, jute, etc., and other inorganic and siliceous yarns or strands are also susceptible to the methods and materials of the invention. In addition, texturized inorganic or organic fibrous yarns such as those disclosed by U.S. 2,661,588, 2,783,609 and 2,924,000 also yield highly desirable products.

It is apparent that new and unusual fibrilocellular materials and methods for their formation, as well as coated yarns and methods for their impregnation, are provided by the present invention.

It is further obvious that various changes, substitutions and alterations may be made in the methods, compositions and products of the invention without departing from the spirit of the invention as defined by the following claims.

What is claimed is:
1. A method for the preparation of porous structures comprising:
   (a) forming a dilute foamable solution of a film-forming organic composition by dissolving a polymer consisting of polystyrene in a primary solvent consisting of benzene,
   (b) causing said dilute solution of a film-forming organic composition and primary solvent to foam while in direct contact with a secondary solvent consisting of butanol, heated at a temperature above the boiling point of the primary solvent, said primary solvent being miscible with said secondary solvent and said film-former being immiscible with said secondary solvent.
   (c) and removing said secondary solvent to leave a fibrilated, foamed body.
2. A method according to claim 1, wherein said polymer is cellulose acetate butyrate, the primary solvent is ethyl acetate and the secondary solvent is isopropanol.
3. A method according to claim 1, wherein said polymer is methyl methacrylate, the primary solvent is toluene and the secondary solvent is methyl isobutyl carbinol.
4. A method according to claim 1, wherein said polymer is polyvinyl chloride, the primary solvent is methyl ethyl ketone and the secondary solvent is water.
5. A method according to claim 1, wherein said polymer is an epoxy resin, the primary solvent is methyl ethyl ketone and the secondary solvent is water.
6. A method according to claim 1, wherein said polymer is polyurethane, the primary solvent is tetrahydrofuran and the secondary solvent is water.
7. A method for the preparation of a reinforced porous structure comprising:
   (a) applying a dilute foamable solution of film-forming material consisting of polystyrene dissolved in benzene, a primary solvent, to fibers to provide a coating on the fibers.
   (b) immersing the coated fibers in a secondary solvent consisting of butanol,
   (c) and heating the fibers in said secondary solvent, to form a fibrillated foamed coating on said fibers, and wherein said dilute solution boils at a temperature below the boiling point of said secondary solvent, and said secondary solvent is heated above said boiling point to cause said coating to foam while in contact with said secondary solvent.
8. The method of claim 7 in which said fibers are glass fibers, said film-forming material is a polyurethane resin, said primary solvent is tetrahydrofuran, and said secondary solvent is water.
9. The method of claim 7 in which said fibers are glass fibers, said film-forming material is a polystyrene, said primary solvent is methyl ethyl ketone, and said secondary solvent is water.
10. The method of claim 7 in which said fibers are glass fibers, said film-forming material is an ethyl acrylate-acrylic acid copolymer, said primary solvent is acetone, and said secondary solvent is water.
11. The method of claim 7 in which said fibers are glass fibers, said film-forming material is a polyvinyl chloride resin, said primary solvent is methyl ethyl ketone, and said secondary solvent is water.
12. The method of claim 7 in which said fibers are glass fibers, said film-forming material is an epoxy resin, said primary solvent is methyl ethyl ketone, and said secondary solvent is water.
13. The method of claim 7 in which said fibers are glass fibers, said film-forming material is a cellulose acetate butyrate polymer, said primary solvent is ethyl acetate, and said secondary solvent is isopropanol.
14. The method of claim 7 in which said fibers are glass fibers, said film-forming material is a methyl meth- acrylate polymer, said primary solvent is toluene, and said secondary solvent is methyl isobutyl carbinol.

References Cited

UNITED STATES PATENTS

| | | | |
|---|---|---|---|
| 3,050,427 | 8/1962 | Slayter et al. | 264—47 |
| 3,144,492 | 8/1964 | Lightner et al. | 264—53 |
| 3,154,605 | 10/1964 | Meyer et al. | 264—53 |
| 3,382,302 | 4/1968 | Marzocchi | 264—45 |

JULIUS FROME, Primary Examiner

L. GARRETT, Assistant Examiner

U.S. Cl. X.R.

117—126, 124; 260—858; 264—53